April 21, 1959  R. R. FINK  2,882,562
STORE FRONT CONSTRUCTION
Filed Feb. 21, 1956
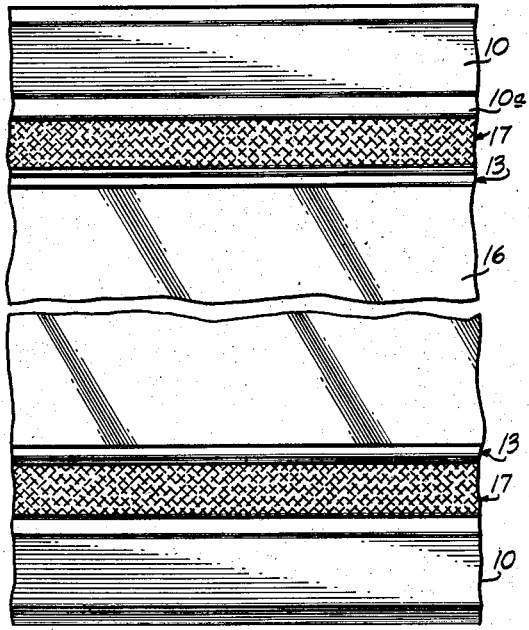
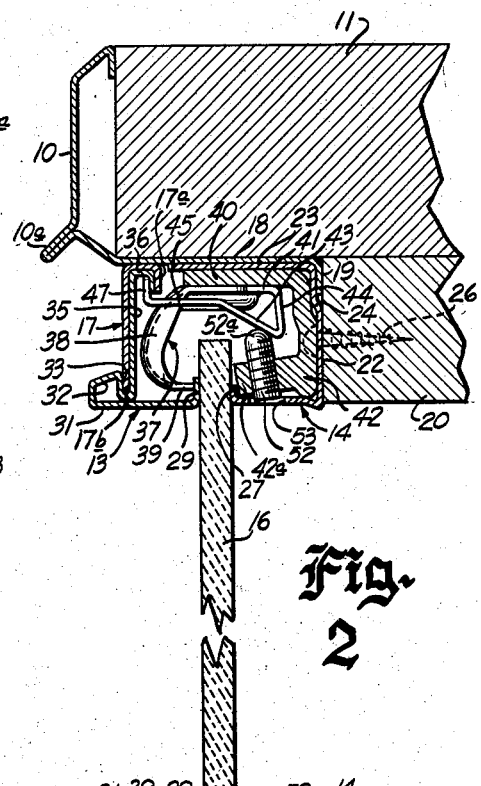
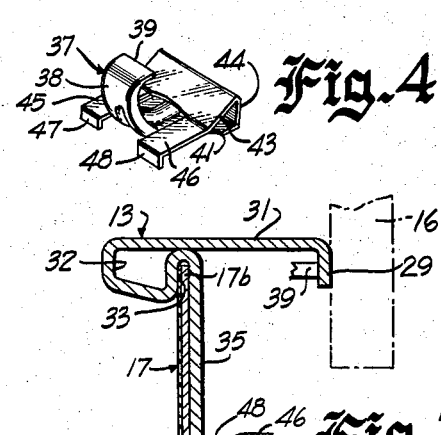
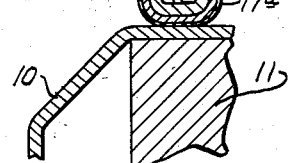
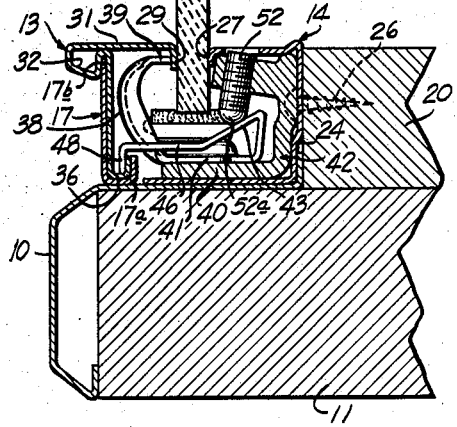
Inventor
Robert R. Fink
by Mason, Kolehmainen, Rathburn and Wyss,
Attorneys.

United States Patent Office 2,882,562
Patented Apr. 21, 1959

2,882,562

STORE FRONT CONSTRUCTION

Robert R. Fink, Niles, Mich., assignor to Kawneer Company, Niles, Mich., a corporation of Delaware Application February 21, 1956, Serial No. 566,843

5 Claims. (Cl. 20—56.4)

The present invention relates to a store front construction, and more specifically to a store front construction in which a glass pane is held in a surrounding frame or molding which is provided with removable and interchangeable colored trim members.

At the present time the preferred type of store front construction consists of a fabricated frame formed of a plurality of extruded metal members to provide a plate glass setting as well as a peripheral molding. Although an all-metal molding has an attractive appearance, for many applications it would be desirable to provide a border having a color and perhaps texture different from that of metal. Moreover, it would be desirable to provide a store front construction having a molding which includes colored trim portions which are easily removable so that the color or pattern of the trim and thus the overall appearance of the frame may be changed simply by replacing the trim portions.

Therefore, a principal object of the present invention is to provide a new and improved store front construction comprising a trim member which is removably secured to the frame which surrounds the window.

Another object of the present invention is to provide a new and improved store front construction which comprises a plurality of metallic extruded members and a colored trim member removably attached to certain ones of the extruded members.

A further object of this invention is to provide a new and improved store front construction in which means are provided for removably attaching a trim strip to the forward glass setting member so that the trim strip may be easily and quickly replaced.

Briefly, in accordance with the present invention, there is provided a store front construction consisting of a peripheral jamb, forward and rearward glass setting members between which a plate glass window pane may be supported and a self-supporting trim member of any suitable color having one marginal edge disposed within a longitudinal groove in the front glass setting member and having the opposite marginal edge thereof folded over the portion of the front glass setting member which lies adjacent the window frame.

The invention, both as to its organization and method of operation, together with further objects and advantages thereof, will best be understood by reference to the following detailed description taken in connection with the accompanying drawings, in which:

Fig. 1 is a fragmentary front elevation view of a store front construction embodying the present invention;

Fig. 2 is a sectional view of the store front of Fig. 1 taken along the line 2—2 thereof;

Fig. 3 is an enlarged cross sectional view of the front glass setting member with the trim strip attached thereto; and Fig. 4 is a perspective view of a bracket used in the store front construction of the present invention.

Referring now to the drawings, briefly, the store front of the present invention comprises a metallic frame and jamb member 10 which is generally J-shaped in cross section and at least partially overlaps the forward and inwardly directed faces of a rectangular casing or window frame member 11. Front and rear glass settings 13 and 14 are resiliently pressed toward one another to secure a plate glass pane 16 between them and the setting 14 is secured to the jamb and to the casing thereby to provide the completely assembled structure.

In accordance with an important aspect of the invention, a colored border for the window is provided by means of a self-supporting, color trim member 17 which may be generally J-shaped in cross section, so as to facilitate attachment thereof to the front glass setting 13. As shown, the U-shaped end portion of the trim member 17 overlaps the U-shaped marginal portion of the front setting 13 which is pressed toward the jamb 10. In this manner, the colored and ornamental trim member 17 is clamped between the setting 13 and the jamb 10, thereby to be removably secured to the store front. It will be noted that the trim member 17 is shown in Fig. 1 to be orange but any other suitable color may be used, and as a practical matter the members 17 may be made available in a wide variety of colors and patterns.

The glass setting members 13 and 14 and the associated trim member 17 may, if desired, be provided on the four peripheral edges of the windowpane 16, identical extrusions being used on all four sides. In regard to the jamb member 10, however, only the jamb piece which extends along the top of the window is ordinarily provided with an integral drip strip 10a since for obvious reasons a drip strip is not required on the side and bottom jamb members.

For the purpose of attaching the jamb member 10 to the frame member 11 the jamb 10 is provided with a web portion 18 which lies against the inwardly directed face of the frame 11 and is also provided with an inwardly directed marginal flange 19 which in the construction shown in Fig. 2 may abut against a rearward frame member 20 which is suitably secured to the frame 11. The glass setting 14 generally consists of a rectangular channel and in a construction in which the rearward casing member 20 is provided, the web 22 abuts against the forwardly directed face of the casing member 20 and is attached thereto by means of a plurality of screws 26. The portion 24 of the web 22 is offset to accommodate the flange 19 so that the web 22 of the setting 14 and the web 18 of the jamb 10 lie flat against the respective members 11 and 20 of the window casing. In a construction in which the rear casing member 20 is not provided, the glass setting 14 may be secured to the casing member 11 by means of a plurality of spatially arranged screws (not shown) which extend through aligned apertures in the flange 23 of the setting 14 and in the web 18 of the jamb 10. It may be seen that in either type of construction the rear setting 14 and the jamb 10 are secured together and to the window frame.

The rear glass setting 14 is provided with a flanged marginal edge portion 27 for engaging the interior surface of the windowpane 16 and the front glass setting 13 is provided with a similar flanged marginal portion 29 for engaging the exterior surface of the windowpane 16 when the glass setting members 13 and 14 are pressed toward one another.

For the purpose of supporting the colored trim member 17 so that it provides an attractive border for the window but cannot be removed from the outside of the store, in accordance with the present invention, the setting 13 is provided with an outwardly extending portion 31 which terminates in a reversely bent portion 32 which lies adjacent to a groove 33 opening toward the periphery of the window. A flat, vertically disposed web 35 adjoins the other side of the groove 33 and the setting 13 terminates in a reversely bent marginal portion 36, which, in the assembled store front, is positioned next to the exterior portion of the web 18. The web 35 and the U-shaped portion 36 of the setting 13 thus provides a surface which conforms to the inner surface on the trim member 17. The reversely bent portion 17a of the trim member 17 may thus overlap the U-shaped marginal portion 36 and the marginal edge 17b of the trim member 17 may be disposed within the groove 33. The trim member 17 thus provides a rectangularly shaped colored border for the window and cannot be removed without first removing the front glass setting 13.

In order to secure the windowpane 16 between the glass engaging flanges 27 and 29 of the glass settings 13 and 14, and also to press the U-shaped portion 36 of the glass setting 13 toward the jamb 10 so as to secure the trim member firmly between the setting 13 and the jamb 10, there is provided a plurality of resilient clips or sash retaining brackets 37, which may be of the type disclosed in Patent No. 2,614,298—Ketchum, and assigned to the assignee of the present application. The brackets 37 are arranged at suitably spaced intervals along the periphery of the windowpane 16 and are each provided with a curved glass holding arm 38 terminating in a hook portion 39 which engages the flange 29 on the setting 13. A plurality of channeled lugs 42 are disposed within the setting 14 at positions corresponding to the brackets 37 and provided with an end portion 42a which engages the flange 27. Therefore, as shown, when the brackets 37 are pressed toward the associated lugs 42 the flanges 27 and 29 are pressed into resilient but firm contact with the opposite faces of the windowpane 16.

Considered in greater detail, each bracket 37 is provided with a body portion comprising a flat base 41 which lies on a flange 40 of the associated lug 42, and an inclined cam 43 is joined to the base portion 41 by a reverse bend 44 at the extreme inner end of the bracket 37. In order to retract the brackets 37 so that the flange 29 of the setting 13 is drawn rearwardly into engagement with the windowpane 16, each lug 42 is provided with a threaded aperture for receiving an adjusting screw 52 which has the lower end 52a thereof rounded for engagement with the inclined cam face 43 on the bracket 37. Spaced apertures 53 or access holes are provided in the glass setting 14 to permit adjustment of the screw 52. As the screw 52 is tightened the rounded end 52a thereof moves against the cam surface 43 of the bracket 37 to bodily retract the bracket 37 toward the lug 42 and thus toward the glass setting member 14.

The sash holding portion of the bracket 37 consists of a pair of sash holding arms 45 and 46 which terminate respectively in hooked portions 47 and 48 which are received in the reversely bent marginal portion of the glass setting member 13, so that as the screw 52 is tightened, in addition to retracting the clip securing the windowpane 16 between the glass engaging flanges 27 and 29, the sash holding arms 45 and 46 are moved toward the jamb 10 to engage the marginal flange of the front setting 13. Further tightening of the screw 52 presses the U-shaped portion 36 of the setting 13 thereof toward the casing 10 and retracts the marginal edge 36 so that the web 35 lies in a substantially vertical plane in the final construction. The trim member 17 is thus held in place and cannot be removed without first loosening the screws 52 and removing the front setting 13.

In order to replace the trim member 17 it is necessary to loosen the adjusting screws 52 until the brackets 37 may be slipped past the rounded end 52a so that the front glass setting member 13 may be bodily removed. The trim member 17 is then removed and replaced with another member of the same or of a different color or pattern as the case may be and the brackets 37 are again positioned within the setting member 13 for attachment to the store front in the manner heretofore described.

In accordance with another aspect of the present invention, in order to provide a colored trim member of sufficient rigidity and yet not subject to cracking both during assembly of the store front and thereafter, the trim member 17 is preferably a lamination of a semi-rigid vinyl plastic and aluminum. In a successful reduction to practice of the invention the lamination was approximately 0.031 inch in thickness in which the ratio of the thickness of the aluminum to the thickness of the vinyl was between two to one and three to one. The laminated strip may first be formed by cementing a vinyl sheet on an aluminum sheet and compressing the sheets together in a hot platen press or rolling operation. After the lamination is thus formed it may be rolled into the J-shape shown in Figs. 2 and 3 to provide a vinyl on aluminum trim member which is self-supporting, has a pleasing appearance, and may be manufactured in a wide variety of colors and patterns at a sufficiently low cost such that the selling price of the overall store front is commensurate with the prices of other types presently on the market. In some situations, it may be desirable to use a colored trim member 17 which consists of an aluminum or other suitable supporting structure having porcelain or other enamel finish on the exposed surface.

It will thus be seen that the store front construction of the present invention provides for the windowpane 16 an attractive border which may be readily replaced and which may be provided in a multitude of different colors and patterns so that the general appearance of the store front may be easily changed merely by replacing the trim member 17.

While the invention has been described in connection with a particular embodiment of the invention, it will be understood that various modifications may be made thereon which are within the true spirit and scope of the invention as defined in the appended claims.

What is claimed as new and desired to be secured by Letters Patent of the United States is:

1. A store front construction comprising a supporting frame including a peripheral jamb, a glass setting disposed within said jamb, said glass setting including a front molding member having a glass engaging portion along one marginal edge and a reversely bent portion along the opposite marginal edge which is juxtaposed with said jamb, an outwardly opening groove in said molding member intermediate said marginal edges, a trim strip having one marginal edge disposed within said groove and the opposite marginal edge overlapping said reversely bent portion so as to be located between said jamb and said molding member, and means for urging the reversely bent portion of said molding member toward said jamb thereby firmly to secure said trim strip to said molding member.

2. Window support and trim construction, comprising, a window frame including a frame member, a glass stop for securing a windowpane on said frame, said glass stop having a recessed portion and a marginal portion spaced at a substantial distance from said recessed portion, a thin trim member having one marginal edge supported in said recess with a portion of the remainder thereof overlapping said marginal portion, and means for urging said marginal portion toward said frame member to wedge said trim member between said glass stop and said frame member to hold the trim member in place.

3. A store front comprising a windowpane, a glass setting for said windowpane, said glass setting including a front piece and a back piece, means for securing said back piece to a window casing or frame, said front piece having a first marginal edge for engaging said windowpane, said front piece having a second marginal edge for engaging said casing, means for forcing said front piece toward said back piece and toward said casing whereby said windowpane is secured between said first marginal edge and said back piece and a seal is provided between said front piece and said casing, and a relatively thin trim member at least partially covering the exposed portion of said front piece and attached to said store front by overlapping at least one of said marginal edges of said front piece.

4. A store front construction comprising a jamb, a first glazing member, a second glazing member, said members being disposed adjacent said jamb on opposite sides of a windowpane, said first glazing member being disposed on the outside of said windowpane and having a groove therein which is parallel to the plane of said windowpane and which opens toward said jamb, said first glazing member having a portion displaced from said groove, said portion being adapted to abut against said jamb, a trim strip having a first marginal edge disposed in said groove, a reversely bent portion of said strip overlying the jamb abutting portion of said first glazing member, and means for clamping said glazing members against said windowpane and for simultaneously forcing said jamb abutting portion of said first glazing member against said jamb to compress said reversely bent portion of said strip between said jamb and said first glazing member.

5. Window support and trim construction comprising a window frame including a frame member, a glass stop for securing a windowpane in said frame, said glass stop having a marginal portion disposed adjacent to said frame and another portion disposed adjacent to said windowpane, a trim member having a marginal edge secured to an intermediate portion of said glass stop and having another portion overlapping the marginal portion of said glass stop which is adjacent to said frame member, and means for urging said glass stop into engagement with said windowpane and for urging said marginal portion of said glass stop toward said frame member to wedge said trim member between said glass stop and said frame member to hold the trim member in place.

References Cited in the file of this patent
UNITED STATES PATENTS

| | | |
|---|---|---|
| 1,845,652 | Faas | Feb. 16, 1932 |
| 1,984,134 | Himmel et al. | Dec. 11, 1934 |
| 2,246,122 | Brennan | June 17, 1941 |
| 2,358,720 | Larmour | Sept. 19, 1944 |
| 2,374,034 | Nichols | Apr. 17, 1945 |
| 2,485,758 | Miller | Oct. 25, 1949 |
| 2,550,305 | Smith | Apr. 24, 1951 |